(12) United States Patent
Dyas et al.

(10) Patent No.: US 10,247,846 B2
(45) Date of Patent: Apr. 2, 2019

(54) TRIAXIAL ANTENNA ARRAY HAVING FOUR SADDLE COILS BETWEEN TWO AXIAL COILS

(75) Inventors: Scott Dyas, Houston, TX (US); Dean M. Homan, Sugar Land, TX (US); Sergiy Kryukov, Houston, TX (US); Reza Taherian, Sugar Land, TX (US); Daniel Codazzi, Houston, TX (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 721 days.

(21) Appl. No.: 14/234,584

(22) PCT Filed: Jun. 28, 2012

(86) PCT No.: PCT/US2012/044497
§ 371 (c)(1),
(2), (4) Date: Oct. 13, 2015

(87) PCT Pub. No.: WO2013/003516
PCT Pub. Date: Jan. 3, 2013

(65) Prior Publication Data
US 2016/0202382 A1 Jul. 14, 2016

Related U.S. Application Data

(60) Provisional application No. 61/502,036, filed on Jun. 28, 2011, provisional application No. 61/509,502, filed on Jul. 19, 2011, provisional application No. 61/511,851, filed on Jul. 26, 2011.

(51) Int. Cl.
*G01V 3/28* (2006.01)
*G01V 3/30* (2006.01)

(52) U.S. Cl.
CPC . *G01V 3/28* (2013.01); *G01V 3/30* (2013.01)

(58) Field of Classification Search
CPC .................................. G01V 3/30; G01V 3/28
See application file for complete search history.

(56) References Cited

U.S. PATENT DOCUMENTS

| 5,045,795 A | 9/1991 | Gianzero et al. |
| 6,255,818 B1 | 7/2001 | Heaton et al. |
| 6,297,639 B1 * | 10/2001 | Clark ....................... G01V 3/30 |
| | | 324/338 |
| 6,586,932 B1 | 7/2003 | Taherian et al. |
| 6,630,830 B2 | 10/2003 | Omeragic et al. |
| 6,788,065 B1 * | 9/2004 | Homan ..................... G01V 3/30 |
| | | 324/338 |

(Continued)

OTHER PUBLICATIONS

Supplementary Partial European Search Report for EP Application No. 12804956.6 dated Jun. 26, 2015.

(Continued)

*Primary Examiner* — Jay Patidar

(57) ABSTRACT

Various triaxial antenna designs having are provided. Some embodiments include a split-z coil that can include two axial coils with saddle coils in the x- and y-directions located therebetween. The split z-coils can function by having a combined magnetic moment similar to that of a single axial coil located between the two parts of the split z-coil. In some examples, the antenna assemblies can include a protrusion or other non-planar structure.

10 Claims, 19 Drawing Sheets

(56) References Cited

U.S. PATENT DOCUMENTS

| | | | |
|---|---|---|---|
| 6,934,635 B2* | 8/2005 | Kennedy | G01V 3/28 324/339 |
| 7,212,173 B2 | 5/2007 | Chen et al. | |
| 8,604,796 B2* | 12/2013 | Wisler | G01V 3/08 324/345 |
| 2001/0004212 A1 | 6/2001 | Omeragic et al. | |
| 2003/0184304 A1* | 10/2003 | Homan | G01V 3/28 324/343 |
| 2003/0184488 A1* | 10/2003 | Smith | G01V 3/28 343/787 |
| 2004/0263414 A1 | 12/2004 | Chen et al. | |
| 2006/0103389 A1 | 5/2006 | Bespalov et al. | |
| 2008/0068022 A1* | 3/2008 | Peter | G01V 3/30 324/338 |
| 2008/0211507 A1 | 9/2008 | Zhdanov | |
| 2009/0167309 A1* | 7/2009 | Homan | G01V 3/28 324/339 |
| 2010/0277176 A1* | 11/2010 | Homan | E21B 47/102 324/333 |
| 2011/0074428 A1 | 3/2011 | Wang | |

OTHER PUBLICATIONS

Australian Examination Report for AU Application No. 2012275351 dated Jul. 7, 2014.
Office Action issued in related EP application 12804956.6 dated Dec. 12, 2015, 7 pages.
European Search Report issued in related EP application 12804956.6 dated Nov. 20, 2015, 8 pages.
First Examination Report issued in related AU application 2015203769 dated Mar. 11, 2016, 3 pages.
International Search Report for International Application No. PCT/US2012/044497 dated Jan. 31, 2013.

* cited by examiner

US 10,247,846 B2

TRIAXIAL ANTENNA ARRAY HAVING FOUR SADDLE COILS BETWEEN TWO AXIAL COILS

TECHNICAL FIELD

The disclosure relates generally to the field of logging a borehole. More specifically, the disclosure relates to triaxial antenna coils with a split z-coil for use with electromagnetic tools.

BACKGROUND

Logging of earth formations using electromagnetic (EM) propagation resistivity is typical accomplished by instruments that form part of a drill string. Such instruments are commonly referred to as "logging while drilling" (LWD) instruments. Typical EM propagation LWD instruments include one or more transmitter antennas, and a plurality of receiver antennas disposed on a drill collar. Radio frequency (RF) power, usually at a frequency in a range of 0.1 to 10 MHz is passed through the one or more transmitter antennas, and an amplitude and phase of RF voltages induced in the receiver antennas are measured. Generally, the conductivity of earth formations proximate any pair of receiver antennas is related to the amplitude ratio and phase difference of the induced voltages between the receiver antennas.

In most EM propagation resistivity LWD instruments, the antennas are formed as loops or coils wound around the exterior of the instrument or drill collar so that they form magnetic dipoles having moments substantially parallel to the axis of the instrument. Such a configuration makes the instrument mainly responsive to the formations disposed laterally around the wellbore proximate the antennas. Various combinations of transmitter and receiver antennas are known in the art which provide responses in particular selected axial positions along the drill collar, and at selected lateral depths from the wellbore, but the sensitivity of most EM propagation LWD instruments is primarily laterally around the instrument. Such sensitivity is most useful when the instrument axis is substantially perpendicular to the attitude ("dip") of the various layers of the earth formations penetrated by the wellbore.

Many conventional EM induction and propagation logging tools have transmitter and receiver antennas that are mounted with their axes along the longitudinal axis of the tool. Thus, these tools are implemented with antennas having longitudinal or axial magnetic dipole moments. A "transverse" antenna or coil has a magnetic dipole moment that is perpendicular to the tool axis, and a "tilted" antenna has a magnetic dipole moment that is neither parallel with nor perpendicular to the tool axis. Many recent patents disclose methods and apparatus to make directional measurements and obtain resistivity anisotropy and bedding orientation, involving tilted or transverse antenna.

Various antenna designs beyond traditional transverse and tilted antennas are possible, and can be used to achieve directional measurements and to obtain resistivity anisotropy and formation dip and azimuth. Each such design has respective advantages and disadvantages. Certain novel antenna designs and related systems and methods are described herein.

DETAILED DESCRIPTION OF THE EXAMPLE EMBODIMENTS

Some embodiments will now be described with reference to the figures. Like elements in the various figures will be referenced with like numbers for consistency. In the following description, numerous details are set forth to provide an understanding of various embodiments and/or features. However, it will be understood by those skilled in the art that some embodiments may be practiced without many of these details and that numerous variations or modifications from the described embodiments are possible. As used here, the terms "above" and "below", "up" and "down", "upper" and "lower", "upwardly" and "downwardly", and other like terms indicating relative positions above or below a given point or element are used in this description to more clearly describe certain embodiments. However, when applied to equipment and methods for use in wells that are deviated or horizontal, such terms may refer to a left to right, right to left, or diagonal relationship as appropriate.

Figure 1:
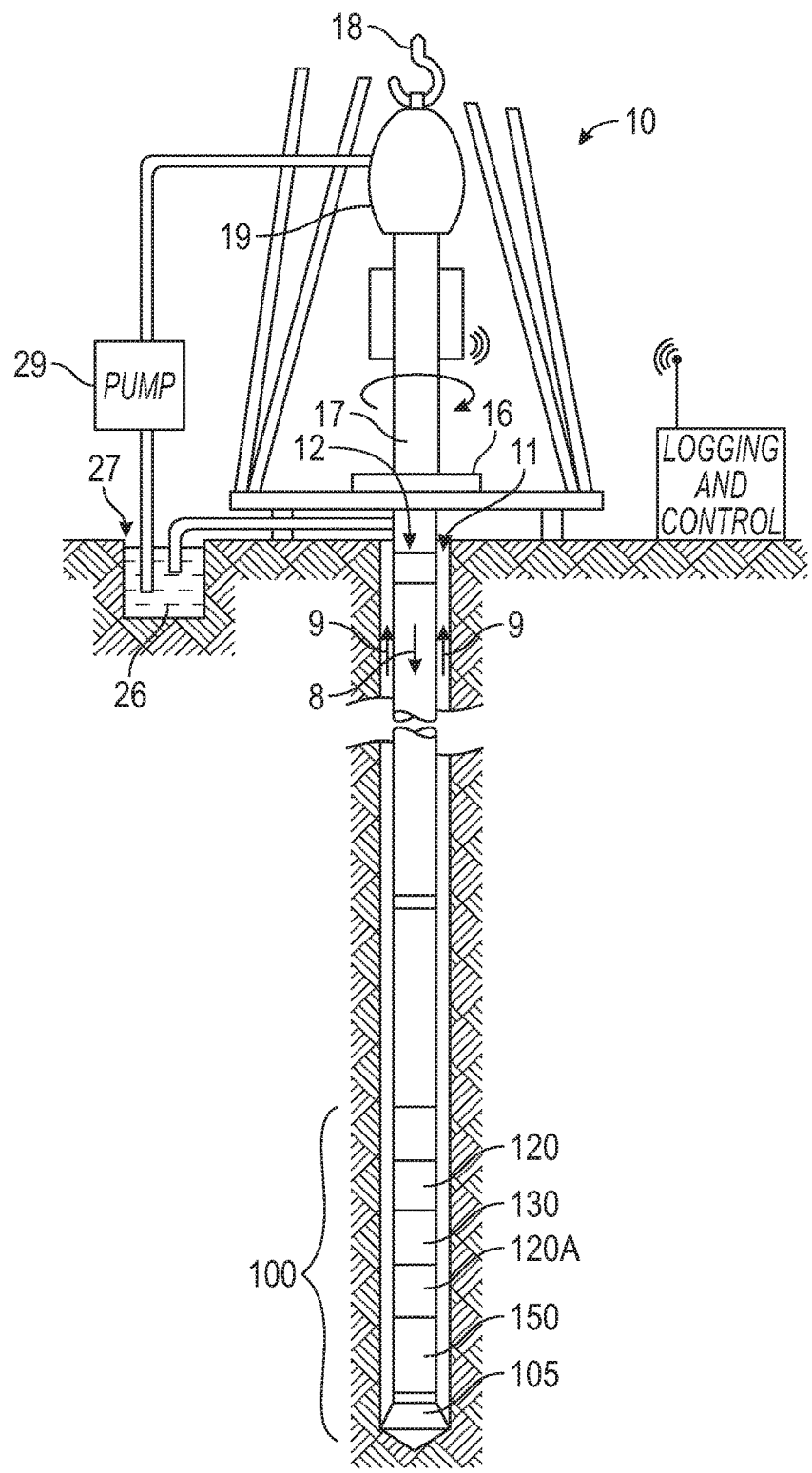
FIG. 1 illustrates a wellsite system in which the present disclosure can be employed, according to an example embodiment.

FIG. 1 illustrates a wellsite system in which the present disclosure can be employed, according to an example embodiment. The wellsite can be onshore or offshore. In this exemplary system, a borehole 11 is formed in subsurface formations by rotary drilling in a manner that is well known. Embodiments of the disclosure can also use directional drilling, as will be described hereinafter.

A drill string 12 is suspended within the borehole 11 and has a bottom hole assembly 100 which includes a drill bit 105 at its lower end. The surface system includes platform and derrick assembly 10 positioned over the borehole 11, the assembly 10 including a rotary table 16, kelly 17, hook 18 and rotary swivel 19. The drill string 12 is rotated by the rotary table 16, energized by means not shown, which engages the kelly 17 at the upper end of the drill string. The drill string 12 is suspended from a hook 18, attached to a traveling block (also not shown), through the kelly 17 and a rotary swivel 19 which permits rotation of the drill string relative to the hook. As is well known, a top drive system could alternatively be used.

In the example of this embodiment, the surface system further includes drilling fluid or mud 26 stored in a pit 27 formed at the well site. A pump 29 delivers the drilling fluid 26 to the interior of the drill string 12 via a port in the swivel 19, causing the drilling fluid to flow downwardly through the drill string 12 as indicated by the directional arrow 8. The drilling fluid exits the drill string 12 via ports in the drill bit 105, and then circulates upwardly through the annulus region between the outside of the drill string and the wall of the borehole, as indicated by the directional arrows 9. In this well known manner, the drilling fluid lubricates the drill bit 105 and carries formation cuttings up to the surface as it is returned to the pit 27 for recirculation.

The bottom hole assembly 100 of the illustrated embodiment a logging-while-drilling (LWD) module 120, a measuring-while-drilling (MWD) module 130, a roto-steerable system and motor, and drill bit 105.

The LWD module 120 is housed in a special type of drill collar, as is known in the art, and can contain one or a plurality of known types of logging tools. It will also be understood that more than one LWD and/or MWD module can be employed, e.g. as represented at 120A. (References, throughout, to a module at the position of 120 can alternatively mean a module at the position of 120A as well.) The LWD module includes capabilities for measuring, processing, and storing information, as well as for communicating with the surface equipment. In the present embodiment, the LWD module includes a directional resistivity measuring device.

The MWD module 130 is also housed in a special type of drill collar, as is known in the art, and can contain one or more devices for measuring characteristics of the drill string and drill bit. The MWD tool further includes an apparatus (not shown) for generating electrical power to the downhole system. This may typically include a mud turbine generator powered by the flow of the drilling fluid, it being understood that other power and/or battery systems may be employed. In the present embodiment, the MWD module includes one or more of the following types of measuring devices: a weight-on-bit measuring device, a torque measuring device, a vibration measuring device, a shock measuring device, a stick slip measuring device, a direction measuring device, and an inclination measuring device.

Figure 2:
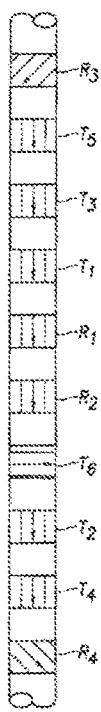
FIG. 2 depicts a directional deep-reading logging-while-drilling drilling tool, as part of the LWD tool or tools in FIG. 1, according to an example embodiment.

FIG. 2 depicts a directional deep-reading logging-while-drilling drilling tool, as part of the LWD tool or tools 120 in FIG. 1, according to an example embodiment. Signals from tools having axially aligned cylindrically symmetrical coils are not directionally sensitive. The tool of FIG. 2 provides tilted and transverse coils to obtain directionally sensitive measurements. The sensor array includes six transmitter antennas and four receiver antennas. Five transmitter antennas (T1 through T5) are arranged axially along the length of the tool. A sixth transmitter antennas (T6) is oriented transverse to the tool axis. A receiver antenna is positioned at each end of the tool. This pair of receiver antennas (R3 and R4) brackets the transmitters, and each of these receivers is tilted 45 degrees to the tool axis. An additional pair of receiver antennas (R1 and R2), located in the center of the transmitter array, is arranged axially and can obtain conventional type propagation resistivity measurements. The described arrangement produces a preferential sensitivity to conductivity on one side of the tool. As the tool rotates, its sensors can detect nearby conductive zones and register the direction from which maximum conductivity can be measured. Magnetometers and accelerometers can provide reference directional orientation data for the tool. In addition to its directional capability, the tool provides relatively deeper measurements than most conventional LWD resistivity tools. The substantially real time bidirectional drill string telemetry hereof, in conjunction with the capabilities of the directional resistivity logging tool, as described, improves performance of geosteering by increasing the amount of data at the surface and the speed and precision of directional drilling control.

Other antenna designs are possible, certain examples of which will be described herein. The antenna designs described herein can be used with the example wellsite system shown in FIG. 1, and/or with other wellsite systems. The antenna designs described herein can be used with, in addition to, and/or instead of the antenna designs described above with reference to FIG. 2.

Logging tools can be long and have a diameter of a few inches. As used herein, as is common practice to those of ordinary skill in the art, the tool longitudinal axis can be considered the z-axis with x- and y-axes perpendicular to the tool axis. Some logging tools use coils for their corresponding functions with the coils wound at different directions for different purposes. Axial coils can be wound around the circumference of the tool and they can generate a magnetic field pattern that is approximately the same as that of a magnetic dipole oriented along the z-axis. In this disclosure, the approximate equivalent magnetic dipole can be used for the sake of simplicity but the approximation may fail in the near field and thus should not be taken literally. Transverse coils can have windings that, once excited, can generate a magnetic dipole perpendicular to the tool axis; such as x-directed, y-directed, or in a direction within the x-y plane. In addition there can be tilted coils that are wound at a slanted angle relative to the tool axis and generate a dipole moment directed at an angle between that of an axial and a transverse coil.

Some distinctions exist between a loop and a coil. The loop can be considered a single turn antenna and can be made to lie within a plane, and as such can be considered a planar antenna. If the wire thickness is ignored, the loop can be considered a two dimensional structure. Coils, conversely, can be a multi turn structure made of a series of circular windings in a helical form. As such, a coil can be considered a three dimensional structure, with a definite z dimension, and by its nature non-planar. The tightest wound coil will have a pitch equal to the diameter of the wire used to wound the coil. As a result, even the individual windings may not be planar. Having established the non-planarity of the coils, the present disclosure is generally concerned with coils with additional levels of non-planarity. Accordingly, as the terms planar and non-planar are used in the present disclosure, it is understood that those terms do not refer to the third dimensional aspects of loops and/or coils caused by the wire thickness and circular windings. Moreover, as the term "coil" is user herein, it can include a single-turn loop as well as a multi-turn structure.

Figure 3:
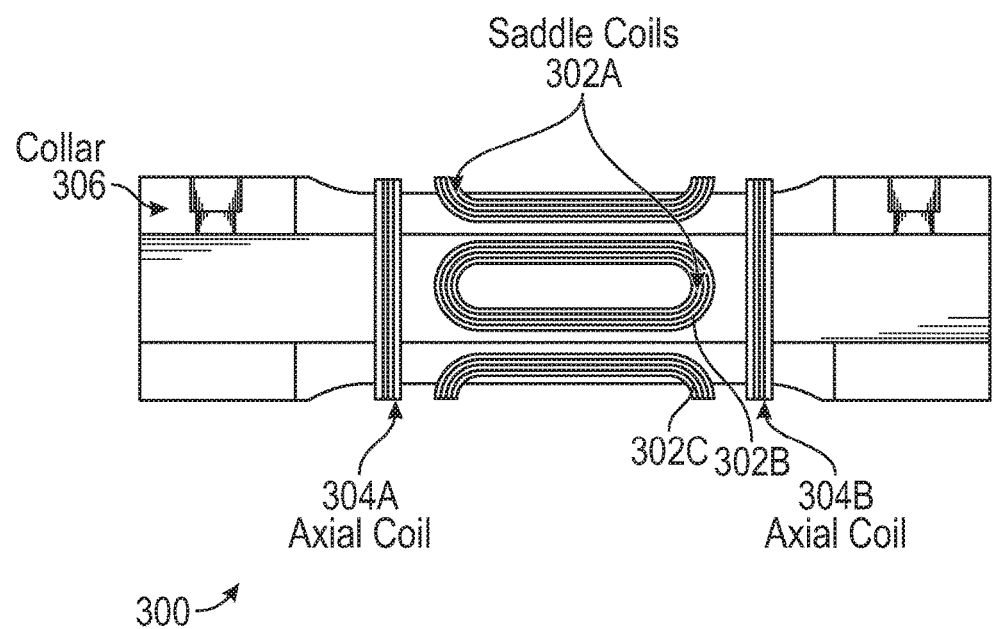
FIG. 3 shows a diagram of an example triaxial antenna with a split z-coil, according to an example embodiment.

FIG. 3 shows a diagram of an example triaxial antenna assembly 300 with a split z-coil 304A, B, according to an example embodiment. The example triaxial antenna of FIG. 3 is shown disposed around a collar 306 of an electromagnetic logging tool. The antenna contains four saddle coils 304A-D (of which one is shown in its entirety, two are shown partially, and the fourth 304D—located azimuthally opposite the first one—is not shown) and two axial coils. The four saddle coils can include two split coils in the x-direction (for example, the two coils that are partially shown) and two split coils in the y-direction (for example, the entirely shown coil and the unshown coil). The axial coils can be considered z-coils, and as shown in FIG. 3, are split with the saddle coils located therebetween. Other combinations of antennas are also possible.

For triaxial antenna measurements made with a triaxial antenna such as the example antenna of FIG. 3, the coils can be used in pairs. The triaxial antenna can be used as a transmitter, a receiver, or both. There is the potential to use the individual coils in different combinations to make additional types of measurements, and to allow self calibration thereof.

A configuration such as the antenna shown in FIG. 3 has certain advantages over conventional collocated antennas, which use antenna coils that are difficult to manufacture. Moreover, conventional antenna coils for electromagnetic logging tools include a shield covering the coils (to protect the coils from the harsh drilling environment) and slots in the shield (cut in such a way to maintain the magnetic moment direction and keep the signal attenuation minimal). Thus, such overlapping antenna coils may use overlapping slots on the antenna shields, which are mechanically infeasible or have poor signal propagation. In fact one can design a shield to force the fields in orthogonal direction (x, y, or z) to be equal by varying the lengths of the shield slots or the number of slots.

In contrast, a configuration such as the antenna shown in FIG. 3 has a Z-coil split into a pair of coils, which can be located symmetrically on either side of the saddle coil arrays, avoiding unnecessary overlapping and the difficulties such a configuration may cause. When measurements are made over a sufficiently long distance, the combined signals transmitted or received by the two z-coils can be approximately equal to a single larger coil halfway between them. Such an arrangement can thus produce magnetic moments similar to that of a conventional collocated triaxial array. In other words, the two z-coils can have a combined magnetic moment that emanates from a location at (or near) the midpoint between the two z-coils, and the magnetic moment is similar or identical to the magnetic moment that would be generated by a single axial coil located at that midpoint. The shields could be made of a nonconductive material like fiber-reinforced thermal plastics or a combination of elastomers, fiber reinforced plastics and ceramic shells.

Figure 4:
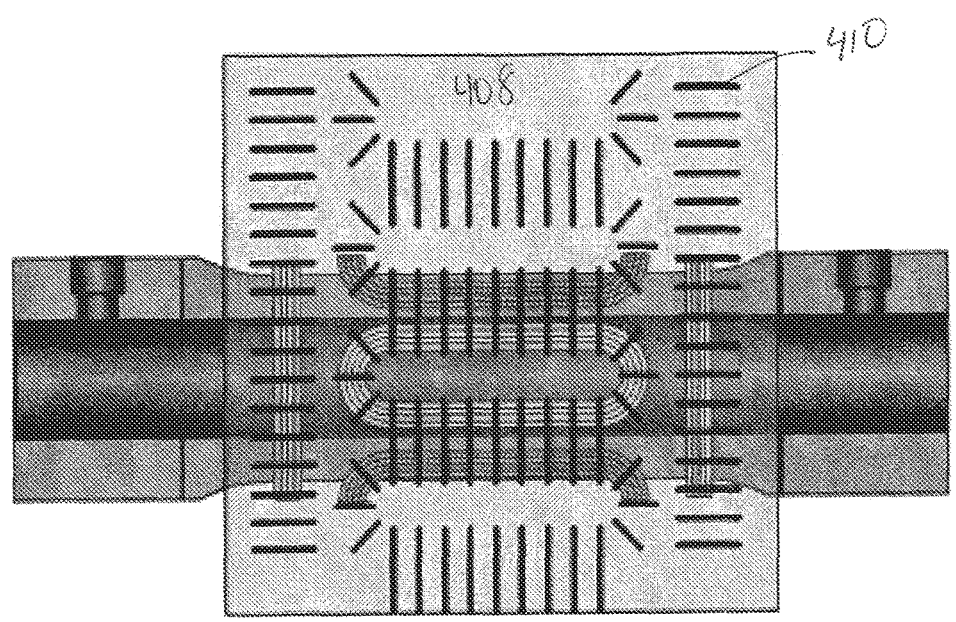
FIG. 4 shows a diagram the example triaxial antenna coil of FIG. 3 along with a shield and shield slots, according to an example embodiment.

FIG. 4 shows a diagram of the example triaxial antenna coil of FIG. 3 along with a shield 408 and shield slots 410, according to an example embodiment. In the embodiment of FIG. 4, an antenna shield is shown (in a cut-open view) with shield slots placed therein. The slots can be arranged in a variety of configurations—such as that shown in FIG. 4—such that the slots do not overlap with each other. As shown in FIG. 4, the orientations of the shield slots can be adjusted to be perpendicular to the coils.

Figure 5:
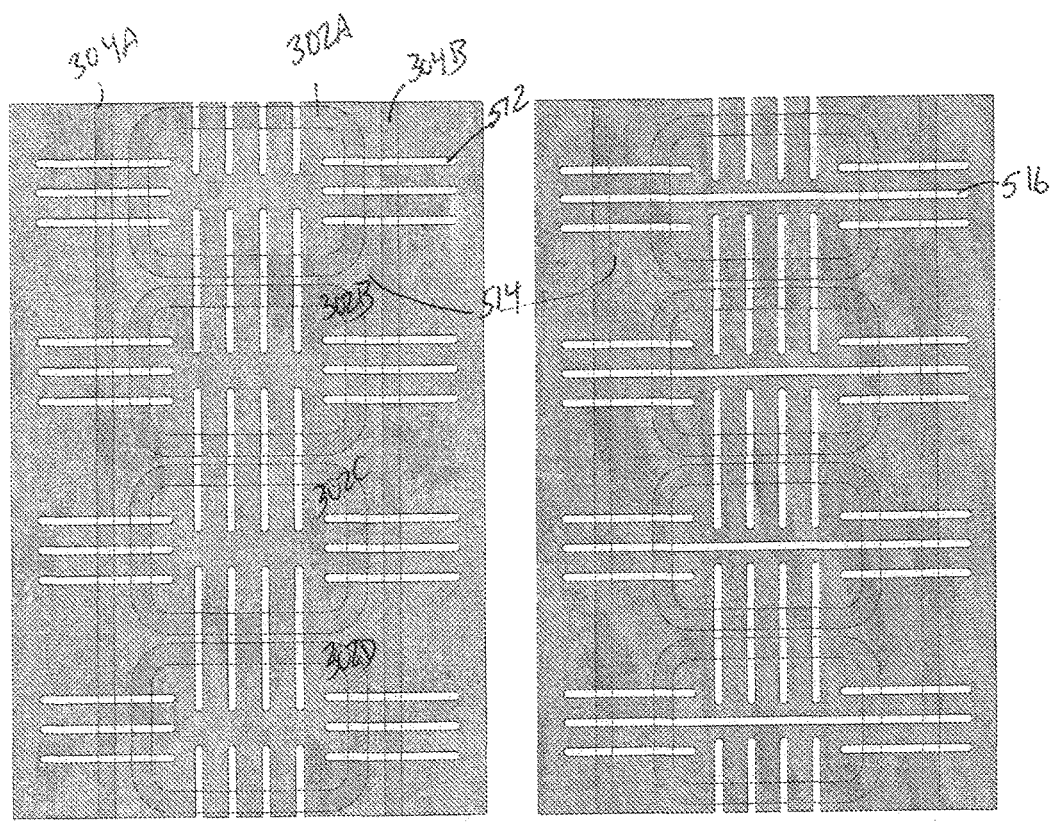
FIG. 5 shows two diagrams of two additional possible antenna shield and slot configurations that can be used, also with perpendicular slots, according to an example embodiment.

FIG. 5 shows two diagrams of two additional possible antenna shield and slot configurations that can be used, also with perpendicular slots, according to an example embodiment. As can be seen in both configurations, the slots 512 in the shields 514 can intersect the coils perpendicularly. Moreover, a single slot can intersect multiple coils (i.e., a z-coil and a y-coil, a z-coil and an x-coil, and/or an x-coil and a y-coil). Moreover, as shown in the example embodiment on the right, a single slot can intersect a coil at multiple points—indeed traversing an entire width of the coil (such as with middle slot intersecting the x-coils and y-coils). This approach can keep the length of a shield smaller.

Figure 6:
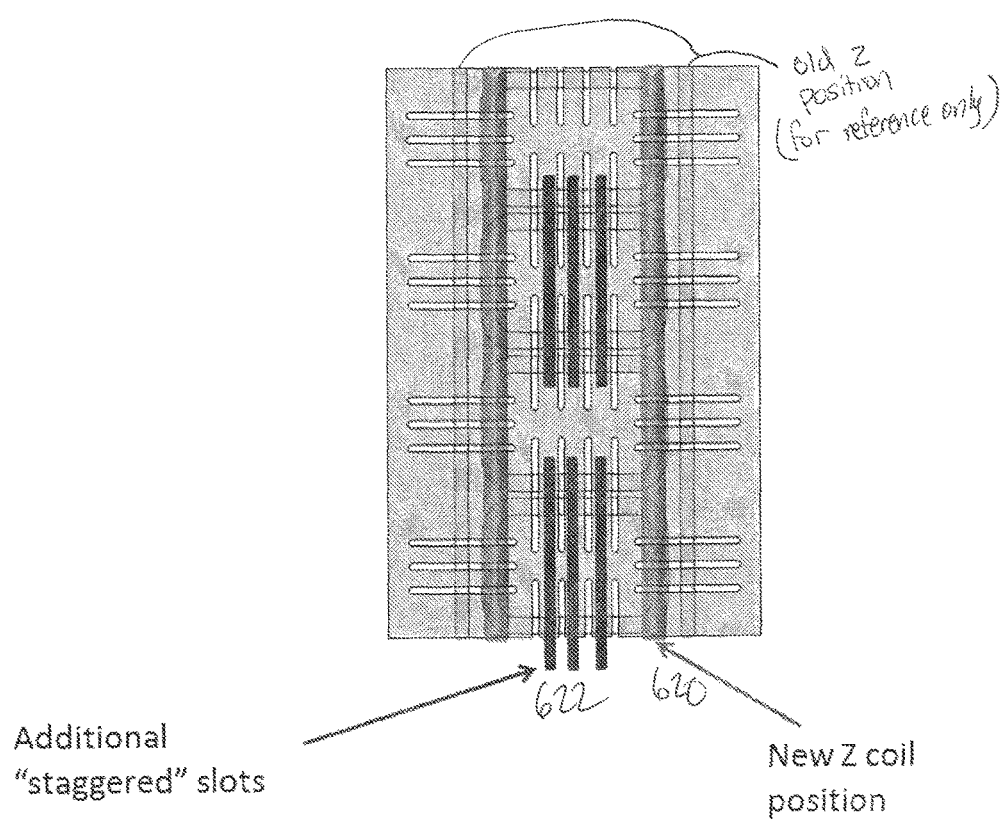
FIG. 6 is a schematic illustration of electronics for a single triaxial antenna array with a split z-coil, according to an example embodiment.
Figure 7A:
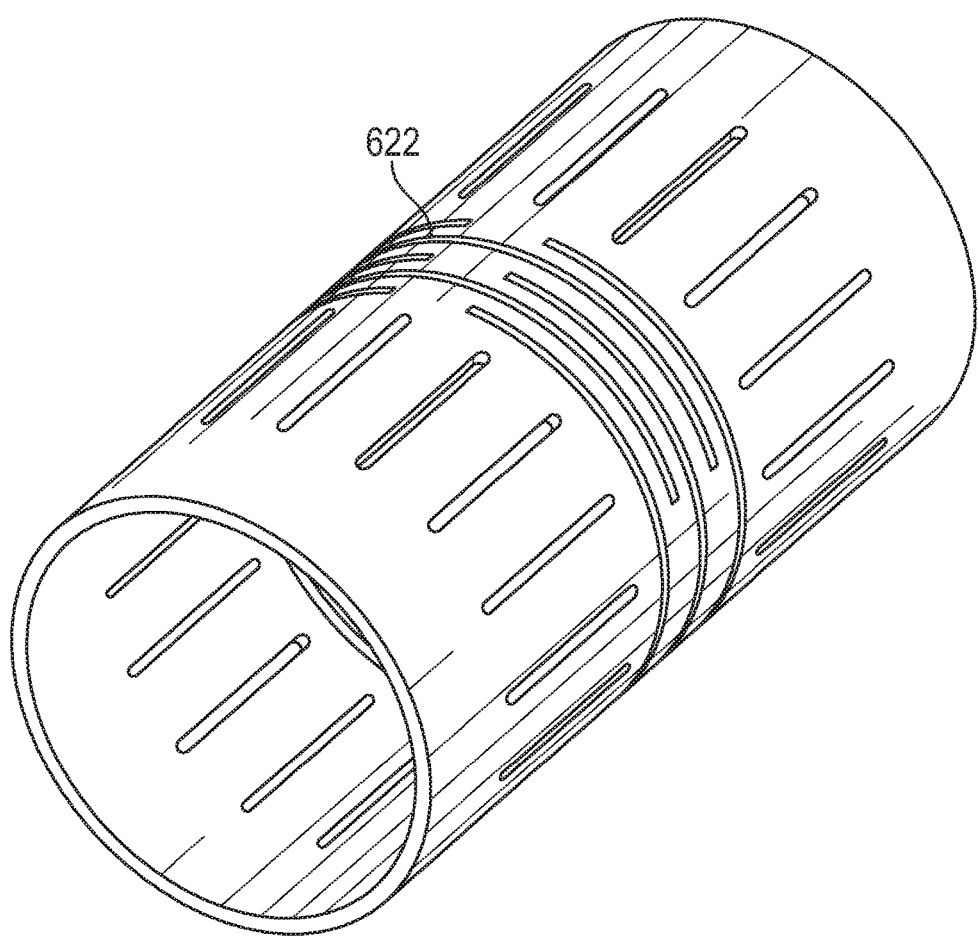
FIG. 7A shows a diagram of a possible antenna shield and slot configuration in cylindrical form, according to an example embodiment
Figure 7B:
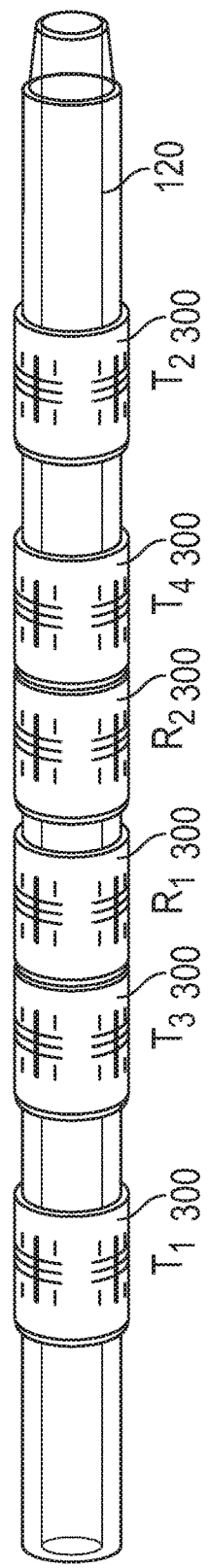
FIG. 7B shows a tool with multiple antenna shield and slot configurations disposed thereon, according to an example embodiment.

FIG. 6 shows a diagram of an additional possible antenna shield and slot configuration that can be used, also with perpendicular slots, according to an example embodiment. As shown in FIG. 6, the split Z-coil is shown moved 620 from the position shown in the above example embodiments. The split Z-coil can, for example, be an additional layer on top of or under the transverse coils. The shield may also have staggered horizontal slots 622 as shown in FIG. 6, and in FIGS. 7A and 7B, which show a diagram of a possible antenna shield and slot configuration in cylindrical form and a diagram of the possible configurations shown on a tool, according to example embodiments.

At relatively shorter antenna spacings, which can be used with higher frequencies, difference in phase and attenuation can occur due to the distance between the two z-coils. Using two or more triaxial antenna arrays consistent with the present disclosure on the same tool can provide similar measurements to existing coaxial resistivity tools, such as the ARC tool of the assignee of the present application. Moreover, the PERISCOPE tool of the assignee of the present application also could be made using three example triaxial arrays with the saddle coils—one of which to replace a transmitter, and two of which can replace receivers.

Figure 8:
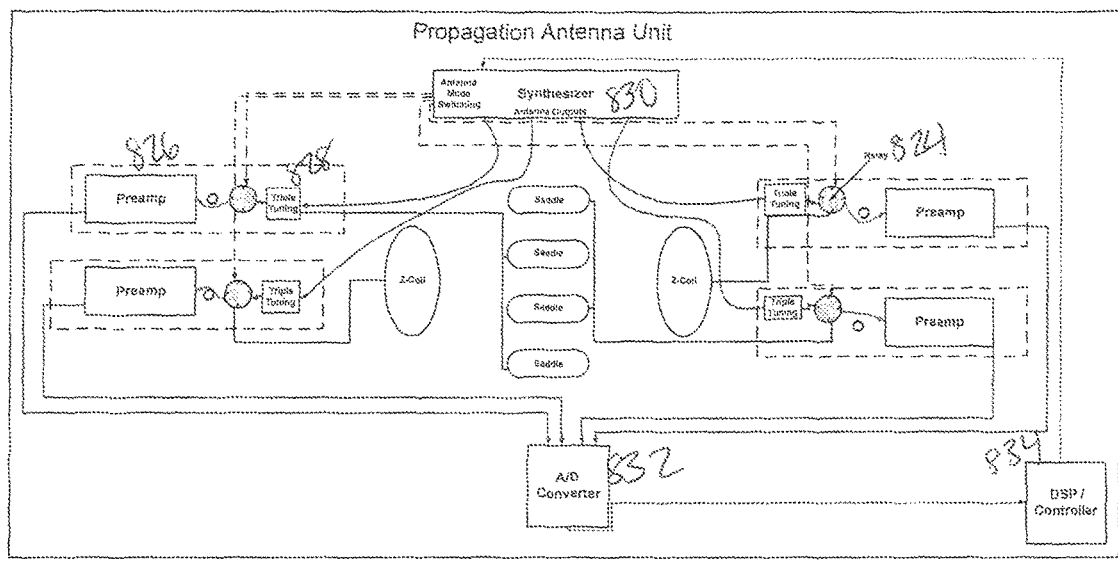
FIG. 8 is a schematic illustration of electronics for a single triaxial antenna array with a split z-coil, according to an example embodiment.

FIG. 8 is a schematic illustration of electronics for a single triaxial antenna array with a split z-coil, according to an example embodiment. As shown in FIG. 8, relays 824 connected to preamps 826 and triple tunings 828—as well as a synthesizer 830—can be used to switch between functions (i.e., transmit and receive). The various components of the electronics (i.e., the A/D converter 832, the DSP/controller 834, and the synthesizer) can allow for the split z-coils to function as a single z-coil by synchronizing the energy emitted therefrom while in transmit mode.

In some embodiments, the components of FIG. 8 can be arranged in various other configurations. For example, the z-coils can be wired as saddle coils. This could be accomplished by using a total of three preamps 826 instead of the two shown. In some embodiments, such a configuration could enable the ability to fire both the x-coils and z-coils at the same time, thereby creating a tilted magnetic moment. In some embodiments, a logging tool can include multiple antennas as disclosed herein. For example, a logging tool can include two sets of example antennas, each having a split z-coil and four saddle coils. In such an embodiment, three depths of investigation can be made for axial measurements by, for example, using all four z-coil parts. Such a configuration also can use symmetrized firing to compensate for variations between antennas.

The example embodiments described above with reference to FIGS. 3-8 generally relate to an antenna having a split z-coil or axial coil. In some embodiments, the split coils can be tilted and/or transverse.

In various example embodiments, other antenna designs beyond the split coils are possible, certain examples of which will be described herein. The antenna designs described herein can be used with the example wellsite system shown in FIG. 1, and/or with other wellsite systems. The antenna designs described herein can be used with, in addition to, and/or instead of the antenna designs described above with reference to FIG. 2 and FIGS. 3-6.

Some distinctions exist between a loop and a coil. The loop can be considered a single turn antenna and can be made to lie within a plane, and as such can be considered a planar antenna. If the wire thickness is ignored, the loop can be considered a two dimensional structure. Coils, conversely, can be a multi turn structure made of a series of circular windings in a helical form. As such, a coil can be considered a three dimensional structure, with a definite z dimension, and by its nature non-planar. The tightest wound coil will have a pitch equal to the diameter of the wire used to wound the coil. As a result, even the individual windings may not be planar. Having established the non-planarity of the coils, the present disclosure is generally concerned with coils with additional levels of non-planarity. Accordingly, as the terms planar and non-planar are used in the present disclosure, it is understood that those terms do not refer to the third dimensional aspects of loops and/or coils caused by the wire thickness and circular windings. Moreover, as the term "coil" is user herein, it can include a single-turn loop as well as a multi-turn structure.

Figure 9:
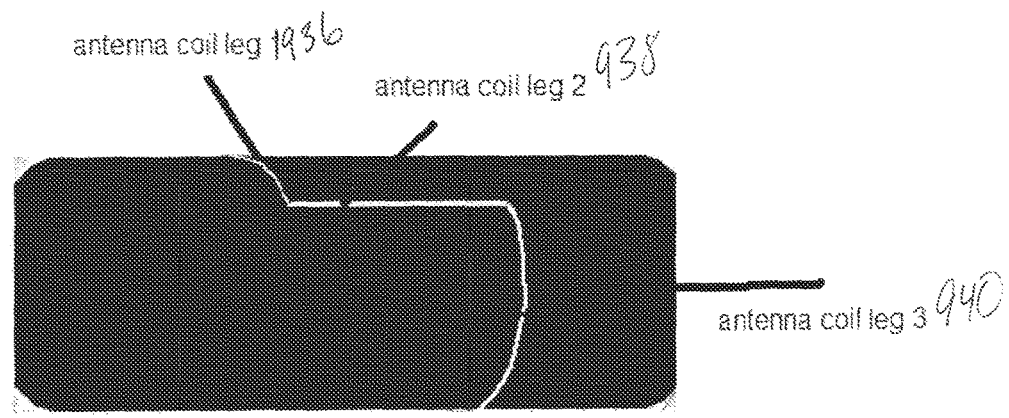
FIG. 9 shows a diagram of an example non-planar coil, according to an example embodiment.

FIG. 9 shows a diagram of an example non-planar coil, according to an example embodiment. The antenna of FIG. 9 is shown as being disposed around a tool. The coil is represented by the solid line, and as shown, can be considered to have four portions or legs. The first leg 936 of the example non-planar antenna extends substantially perpendicularly to the axis of the tool (i.e., the first leg can be disposed around a portion of the tool). In some embodiments, the first leg can extend over approximately half of the radial circumference of the tool. The second leg 938 of the example non-planar antenna extends substantially in the same direction as the axis of the tool, and is thus substantially perpendicular to the direction of extension of the first leg axis. The third leg 940 of the antenna coil extends substantially perpendicularly to the direction of the second leg's extension. The third leg can extend over approximately half of the radial circumference of the tool (i.e., the radial portion of the tool's circumference over which the first leg does not extend). The fourth leg (not shown) can be substantially the same as the second leg (i.e., substantially perpendicular to—and connecting—the first and third legs), but located approximately 180 degrees apart from the second leg. In some embodiments, the fourth leg can be located elsewhere other than 180 degrees apart from the second leg.

Although FIG. 9 shows the first and third legs as being substantially perpendicular to the second leg, other angles among the legs are possible. In some example embodiments, including the illustrated embodiment, the first leg can be considered to exist substantially within a first plane and the third leg can be considered to exist substantially within a second plane, with the second and fourth legs or sections functioning as connector sections to connect these two sections in the two planes. Moreover, in some embodiments, the antenna can have additional legs or sections in additional planes, each adjoined by substantially axially oriented legs such as the second and fourth legs.

In some embodiments, such as the illustrated embodiment, the coil of the antenna can be wound in such a way that is not in a plane but can produce a magnetic moment tilted in an angle with respect to the tool axis. The angles of the coil (i.e., the angles by which the legs connect with each other) can be adjusted in various embodiments to vary the tilted angled of the magnetic moment.

Figure 10:
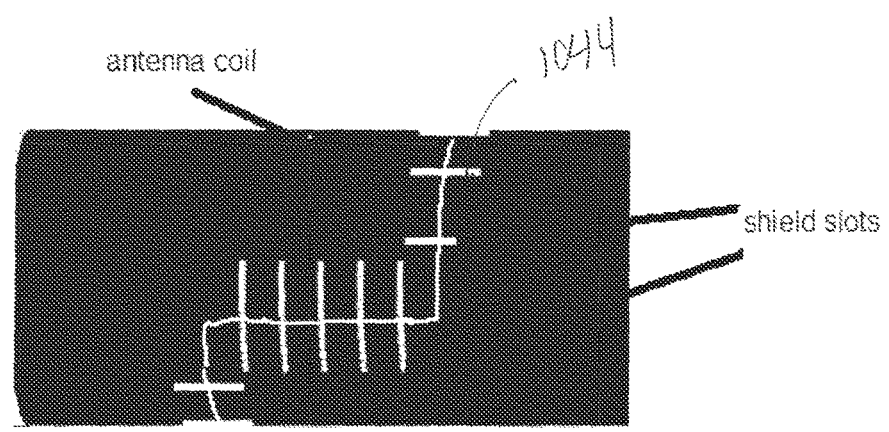
FIG. 10 shows a diagram of an example non-planar coil with shield slots, according to an example embodiment.

FIG. 10 shows a diagram of an example non-planar coil with shield slots, according to an example embodiment. The antenna of FIG. 10 is similar to the antenna of FIG. 9, and additionally includes a plurality of shield slots 1044 placed over the length of the coil. As shown in FIG. 10, the orientations of the shield slots can be adjusted to be perpendicular to the coil over each of the legs. The illustrated metallic shield design includes slots cut in such a way to maintain the magnetic moment direction and keep the signal attenuation to the minimal. The metallic shield can be placed over the coil to protect the coil from the harsh drilling conditions.

Figure 11:
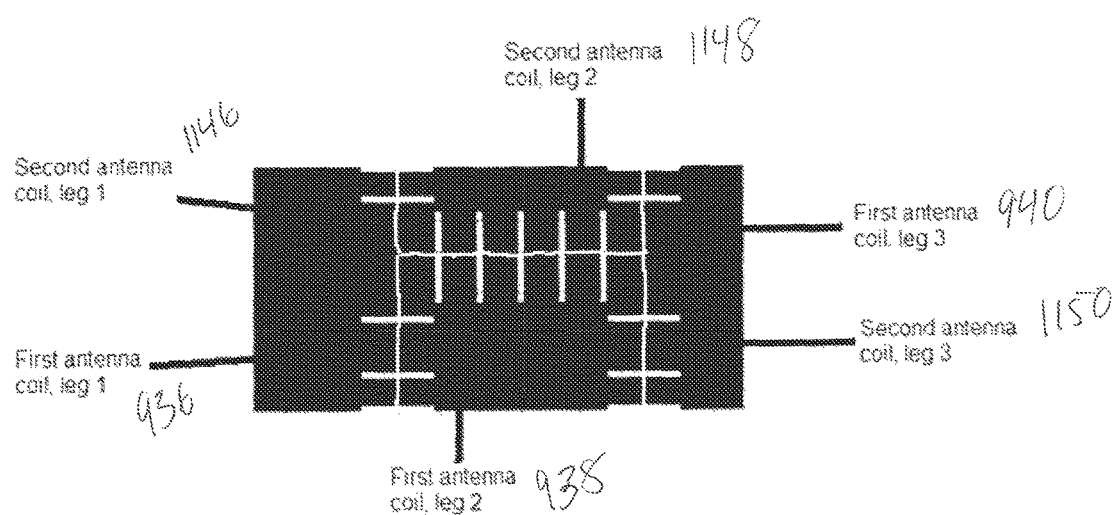
FIG. 11 shows a diagram of an example of two non-planar, collocated antenna coils with shield slots, according to an example embodiment.

In some embodiments, collocated antennas (i.e., antennas located at substantially the same location) can be used. FIG. 11 shows a diagram of an example of two non-planar, collocated antenna coils with shield slots, according to an example embodiment. In some embodiments, the collocated antennas can be substantially similar or identical to the single antenna shown in FIG. 10, but with the addition of another antenna and corresponding shield slots.

As shown in FIG. 11, in some embodiments, the two collocated antennas can include a first antenna coil and a second antenna coil, each having four legs. As described with reference to FIG. 9, the first leg 936, 1146 of each of the antenna coils can extend substantially perpendicularly to the axis of the tool (i.e., the first legs can be disposed around a portion of the tool). The second legs 938, 1148 and fourth (not shown) legs of the example non-planar antenna can extend substantially in the same direction as the axis of the tool, and are thus substantially perpendicular to the directions of extension of the first legs axes. The third legs 940, 1150 of the antenna coil can extend substantially perpendicularly to the direction of the second legs' extension. Moreover, in the illustrated embodiment, the first leg of the first antenna coil can extend over approximately half of the radial circumference of the tool, with the first leg of the second antenna coil extending over the remaining portion of the radial circumference of the tool at approximately the same axial position as the first leg of the first antenna coil. Similarly, as shown in the illustrated embodiment, the third leg of the first antenna coil and the third leg of the second antenna coil can each extend over approximately half of the radial circumference of the tool without substantial overlap. Further, as is the case in the illustrated embodiment, the second and fourth legs of each antenna coil can be located at substantially the same (or similar) location. When the two collocated antennas are arranged as shown in the illustrated embodiment, the magnetic moments of each antenna can be tilted at substantially the same angle as each other with respect to the axis of the tool, but be approximately 180 degrees apart azimuthally.

In other embodiments, other arrangements are possible, as the second and fourth legs need not be located at the same or similar location, and the first and third legs need not be exactly or substantially 180 degrees separated from each other so as to each cover half of the radial circumference of the tool. In these other embodiments, arranging the coils in different positions can affect the magnetic moment of the respective antenna coils.

Figure 12:
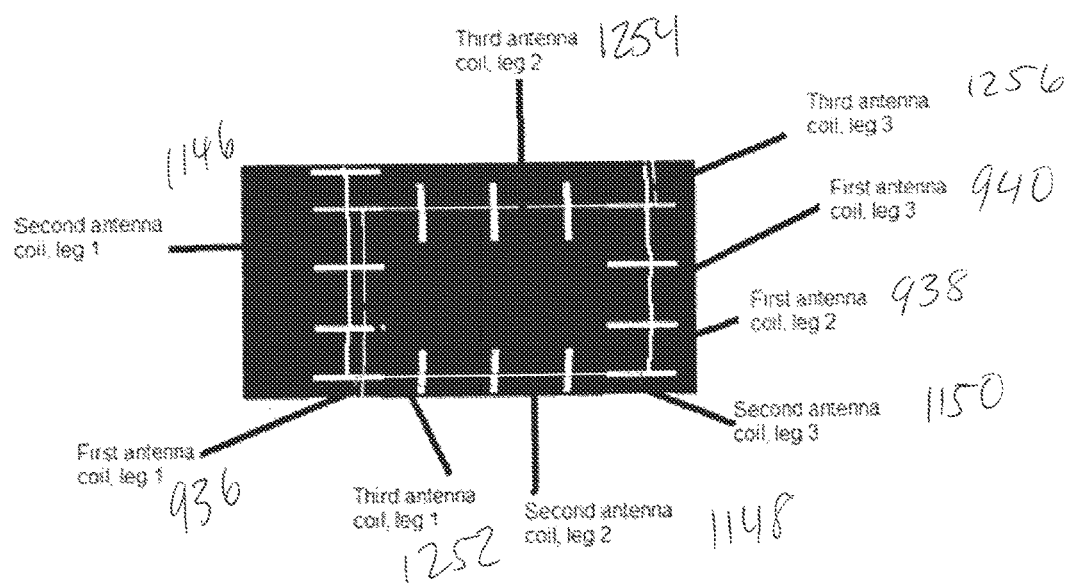
FIG. 12 shows a diagram of an example of three non-planar, collocated antenna coils with shield slots, according to an example embodiment.

In yet other embodiments, additional collocated antennas can be used. For example, FIG. 12 shows a diagram of an example of three non-planar, collocated antenna coils with shield slots, according to an example embodiment. In some embodiments, the three non-planar collocated antenna coils can be substantially the same or similar to two collocated antenna coils shown above in FIG. 11 (that are approximately 180 degrees separated from each other), with a third antenna coil added that is approximately 90 degrees separated from each of the first two antenna coils, the third antenna coil having a first leg 1252, a second leg 1254, and a third leg 1256 shown and a fourth leg not shown similarly to FIGS. 9-11. The three collocated antenna coils of FIG. 12 are similar to this configuration but are shows as slightly axially separated from each other, as can be seen by axial gaps among the three antenna coils. To make the antennas most collocated, it would be desirable to have as small an axial gap therebetween as possible in some embodiments; however, in other embodiments, it may be noted that machining and placing the antenna coils can be somewhat easier if a small axial gap is present. When three collocated antennas are arranged as shown in the illustrated embodiment, the magnetic moments of each antenna can be tilted at substantially the same angle as each other with respect to the axis of the tool, but be approximately 90 degrees (for the third antenna coil) or 180 degrees apart azimuthally.

Figure 13:
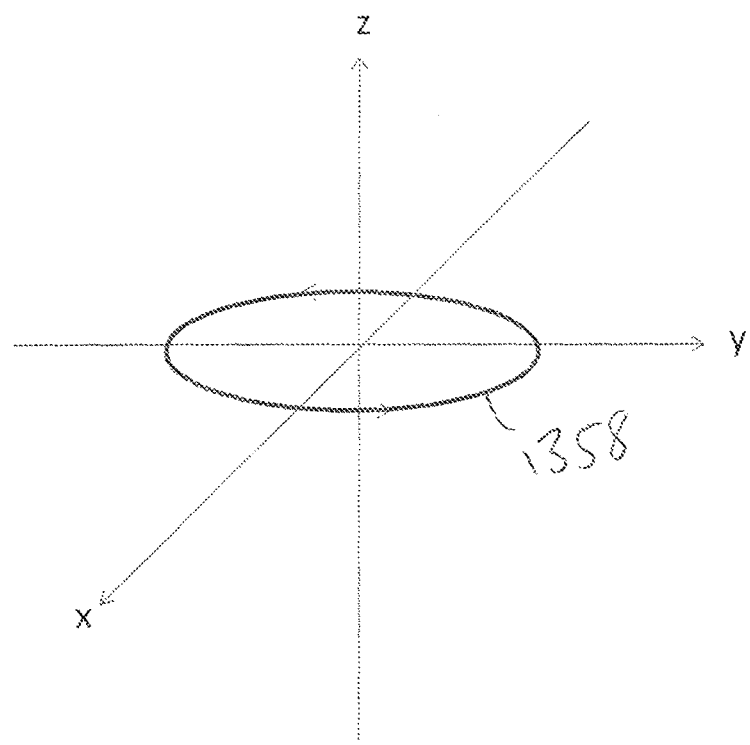
FIG. 13 shows a diagram of an example planar axial coil having a single turn coil, i.e. a loop antenna, according to an example embodiment.

FIG. 13 shows a diagram of an example planar axial coil 1358 having a single turn coil, i.e. a loop antenna, according to an example embodiment. The wire in this coil is shown entirely in the x-y plane (pitch=0) which makes the coil planar.

Figure 14:
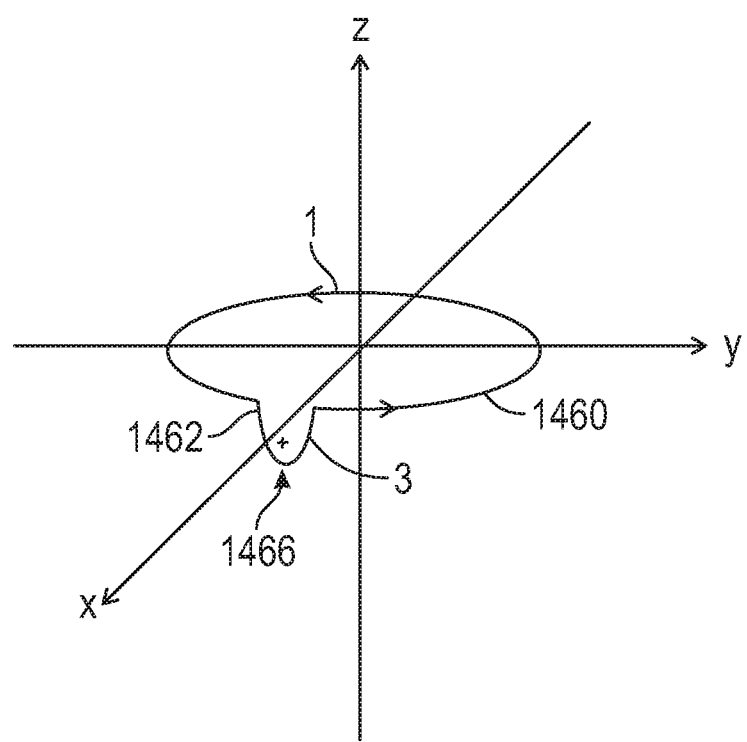
FIG. 14 shows a diagram of an example non-planar antenna, according to an example embodiment.

As expected, the coil of FIG. 13 is a planar loop (ignoring the wire thickness) with no current component in the z direction and thus can serve as an ideal axial coil. FIG. 14 shows a diagram of an example non-planar antenna, according to an example embodiment. The coil of FIG. 14, unlike that of FIG. 13, has a U shaped protrusion 1466 that carries current in the z direction. This coil is non-planar even though includes only a single turn. For simplicity, only one protrusion is shown in the embodiment of FIG. 14, but this is not a limitation of the method. Indeed any number of protrusions could be included.

The leg 1462 of protrusion in the embodiment FIG. 14 carries the current from the base 1460 (x-y plane) along the −z axis and then the leg 1464 returns the current back to the base. Using the right hand rule, with the current direction shown, the magnetic field lines for both legs of the protrusion come out of the protrusion in the middle (as shown by the + sign). This arrangement of magnetic field lines can be considered equivalent to a magnetic dipole along the +x direction (albeit the location of the dipole can be slightly shifted along the −z axis). Note that the protrusion shown in FIG. 14 is a single turn, but this is not a limitation of the method and multiple turns can be used to achieve as desired. In example embodiments, the wire in the base can also generate a magnetic moment along the z-axis, and the net magnetic dipole will be the vector sum of these two (in the +x and z quadrant). As shown in FIG. 14, the field pattern of the loop of FIG. 14 can be similar or identical to that of a tilted coil. The loop of FIG. 14 can thus be considered non-planar and can have a moment similar to a loop antenna with a tilt angle that is a function of the relative strength of the two magnetic moments from the base and the protrusion.

The protrusion in FIG. 14 can be moved along the circumference of the loop to create tilted dipole moments of different orientations. Moving the protrusion to the y-axis, for example will create a tilted magnetic dipole in the yz plane. In addition, the protrusion can be moved up (along the +z direction) which creates a tilted magnetic moment that is a vector in the +x and +z quadrant.

Figure 15:
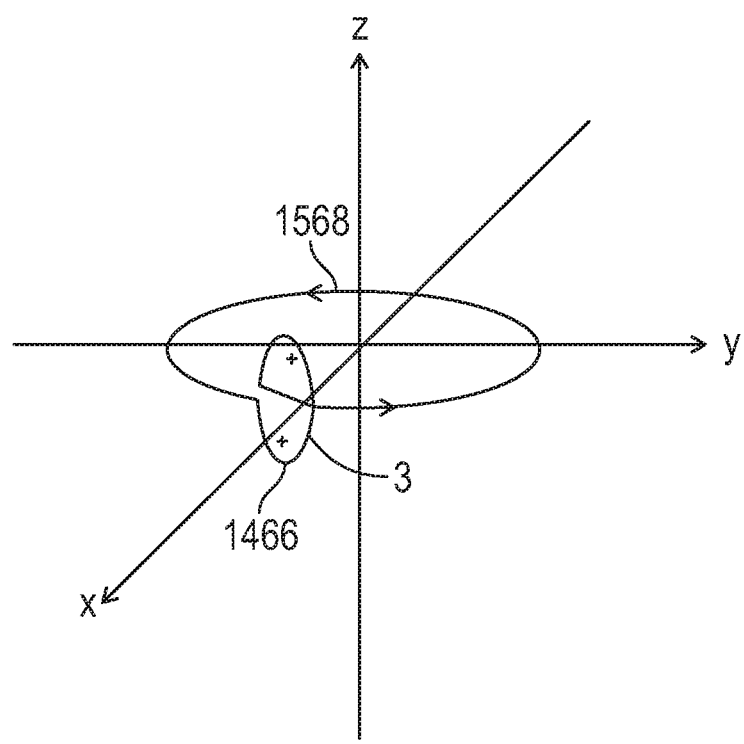
FIG. 15 shows a diagram of an example non-planar antenna, according to an example embodiment.

FIG. 15 shows a diagram of an example non-planar antenna, according to an example embodiment. The embodiment illustrated in FIG. 15 is a variant of FIG. 14 in which there are two protrusions 1466, 1568 in the +z and −z directions and the current direction is such that the two reinforce each other. In this arrangement the x-directed magnetic dipole (which is the sum of moments from the two protrusions) is no longer shifted along the −z axis and is also a stronger dipole compared to that of FIG. 14. The antenna of FIG. 15, like that of FIG. 14, is non-planar and has a tilted dipole moment.

Figure 16:
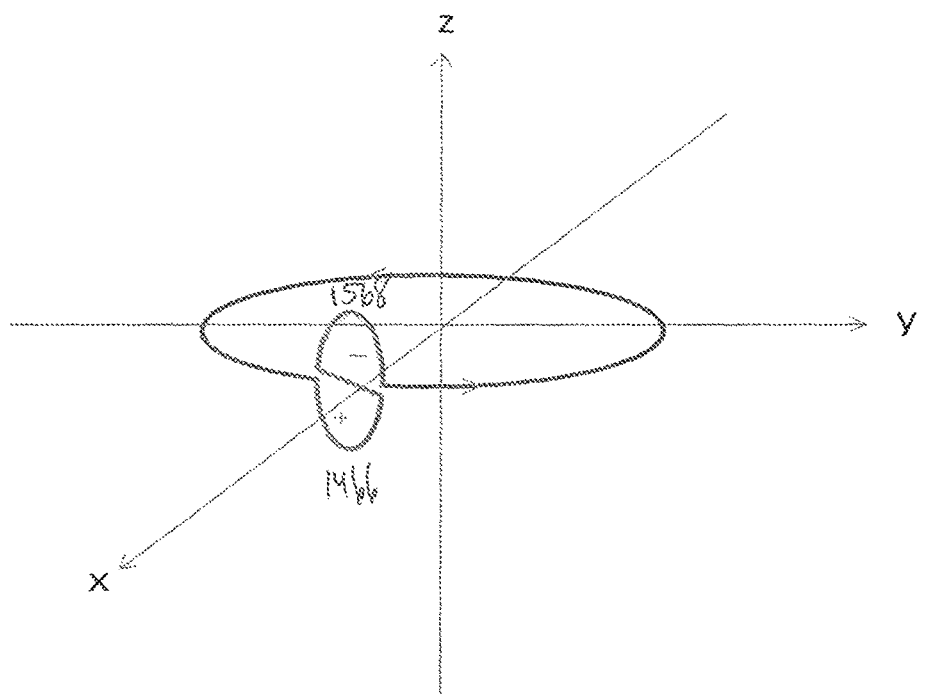
FIG. 16 shows a diagram of an example non-planar antenna, according to an example embodiment.

FIG. 16 shows a diagram of an example non-planar antenna, according to an example embodiment. In FIG. 16 the two protrusions 1466, 1568 are such that they don't reinforce each other; as shown by the + and − symbols the magnetic dipoles are in opposite directions. If the dimensions and the number of turns of the protrusions are designed to be the same, the net effect of these two protrusions is nil and the coil generates a magnetic dipole solely in the z direction. This coil, however, is not flat thus it is possible to have an axial coil that is non-planar even if it has only a single turn.

Figure 17:
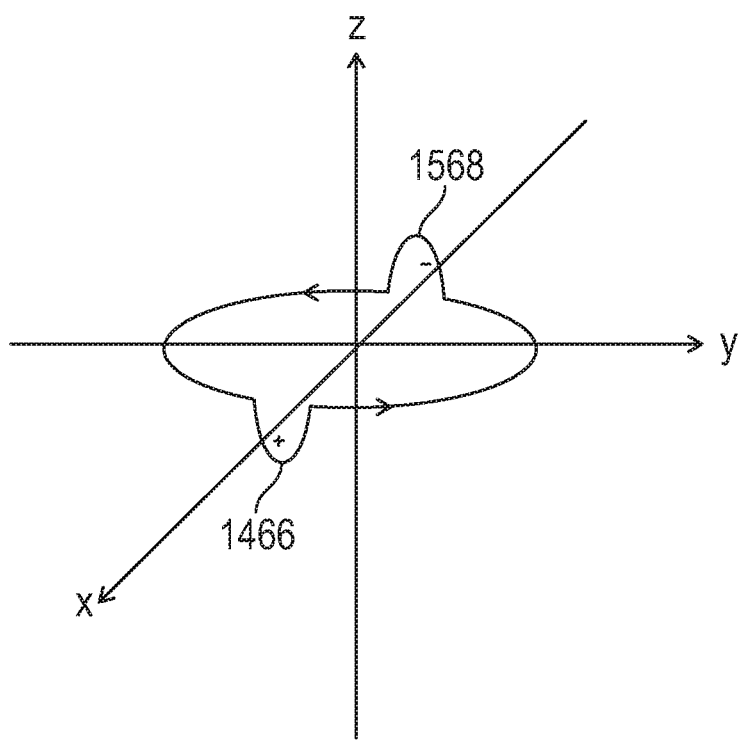
FIG. 17 shows a diagram of an example non-planar antenna, according to an example embodiment.

The antennas of FIGS. 15 and 16 are simple examples of interaction between two adjacent protrusions. In some embodiments, many of the foregoing concepts can be expanded to non-adjacent protrusions. For example, FIG. 17 shows a diagram of an example non-planar antenna, according to an example embodiment. The antenna of FIG. 17 can be considered a non-adjacent version of the antenna of FIG. 16, wherein the two protrusions are located symmetrically (180 degrees from each other; +x and −x for example).

Figure 18:
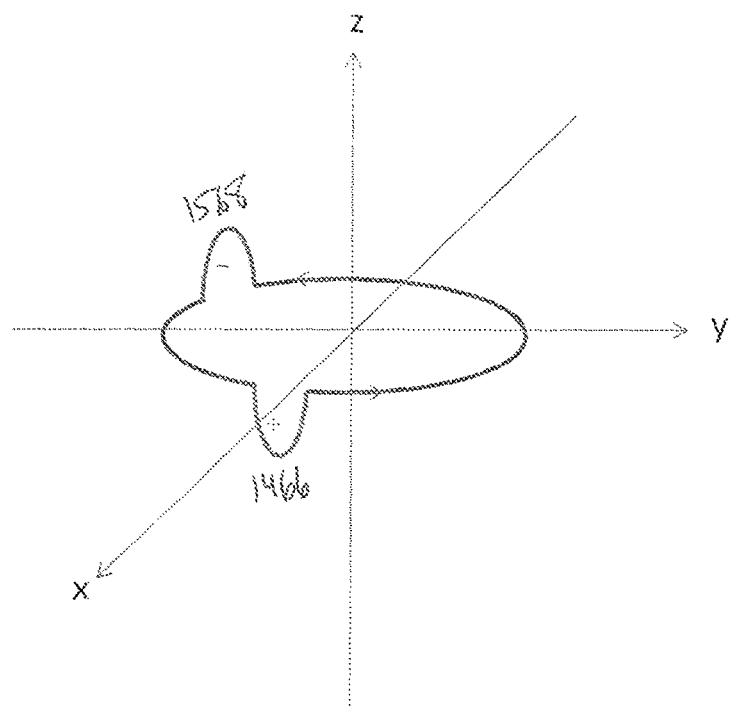
FIG. 18 shows a diagram of an example non-planar antenna, according to an example embodiment.

In some embodiments, an antenna similar to that of FIGS. 15 and 16 but having symmetrically distributed non-adjacent protrusions may result in a magnetic moment that may not be different from those of FIGS. 15 and 16, respectively, as shown by the example in FIG. 17. Additionally, if the two equal sized protrusions 1466, 1568 are not symmetrically located (angles different from 0 and 180 degrees), then the vector sum of the magnetic moments from the two protrusions would be in the xy plane and in general non-zero. The net magnetic moment will be tilted. This is true even for the two protrusions of FIG. 16. FIG. 18 shows such arrangement, as it is a diagram of an example non-planar antenna, according to an example embodiment.

The examples of FIGS. 17 and 18 are drawn with protrusions 1466, 1568 above and below the x-y plane, but this is not a requirement and they can be distributed on the same side or opposite side of the plane if desired. Furthermore the size of protrusions need not be the same. In determining the net effect of protrusions to the dipole moment of the antenna the vector sum of moments from protrusions and the base should be considered. Thus it is possible to distribute various ensembles of protrusion moments along the perimeter of the base and construct a net desired dipole moment. In this exercise the direction of current in each protrusion can be used to define the direction of the individual moment and the size of protrusion can be used to define the size of dipole.

In some embodiments, the foregoing concepts and discussion can be extended to an axial coil with more than two protrusions. As the net dipole is the vector sum of dipole moments, a key concern is whether the protrusions are distributed symmetrically. In example embodiments, if there are an equal number of protrusions, with opposite dipole moments that are distributed symmetrically, their resulting dipole moment may be arranged to be zero and the coil may be considered to be a pure z-directed magnetic dipole despite the presence of protrusions. In this case, the result in a non-planar axial coil. If the distribution is non-symmetric, the resulting dipole moment may not be zero and will add to the z-directed dipole leading to a coil that has a titled magnetic moment. Lack of symmetry prevents the dipole moment of the protrusions to add to zero, however, the presence of the protrusions makes the coil non-planar.

If the dipole moments of the protrusions are in the same direction, then they add to a non-zero dipole, independent of the way they are distributed. In these cases the coil will have a non-planar, tilted magnetic moment.

Although some of the disclosure specifically refers to logging-while-drilling tools, as one of ordinary skill in the art may recognize with the benefit of the present disclosure, certain aspects of the foregoing disclosure could apply to tools and toolstrings used in wireline, drill pipe conveyance, wired drill pipe, coiled tubing drilling, logging-while-drilling and/or measuring-while-drilling applications, or other methods of conveyance, in addition.

Additionally, though specific embodiments of the disclosure have been described above in detail, the description is merely for purposes of illustration. Additional and/or alternative designs are also possible. Various modifications of, and equivalent steps corresponding to, the disclosed aspects of the example embodiments, in addition to those described above, can be made by those skilled in the art without departing from the spirit and scope of the disclosure defined in the following claims, the scope of which is to be accorded the broadest interpretation so as to encompass such modifications and equivalent structures.

What is claimed is:

1. A triaxial antenna assembly for an electromagnetic logging tool comprising a first triaxial antenna, the first triaxial antenna comprising:
   two axial coils;
   four saddle coils disposed between the two axial coils, wherein the four saddle coils each comprise two axially-extending sections and two arcuate sections that are connected between the two axially-extending sections, the two axial coils each overlaying or underlaying one of the arcuate sections of each of the four saddle coils; and
   a shield disposed over the two axial coils and the four saddle coils, wherein the shield comprises slots therein that each extend in a single direction such that none of the slots intersect, and wherein the slots comprise:
       at least one first slot that extends axially, parallel to a longitudinal axis of the tool, and overlays at least one of the two axial coils and at least one arcuate section of at least one of the four saddle coils; and
       at least one second slot that extends circumferentially at least partially around the longitudinal axis and overlays at least one of the axially-extending sections of the four saddle coils.

2. The triaxial antenna assembly of claim 1, wherein the four saddle coils comprise a first pair of coils in an x-direction and a second pair of coils in a y-direction, and wherein the two axial coils comprise a third pair of coils in a z-direction.

3. The triaxial antenna assembly of claim 2, wherein the two axial coils function as a single axial antenna having a first magnetic moment emanating from substantially halfway between the two axial coils.

4. The triaxial antenna assembly of claim 3, wherein the first magnetic moment emanates from a location collocated with a second magnetic moment and a third magnetic moment, the second magnetic moment being associated with the first pair of coils, and the third magnetic moment being associated with the second pair of coils.

5. The triaxial antenna assembly of claim 2, wherein the first pair of coils in the x-direction comprises a first saddle coil and a second saddle coil, the first saddle coil in the x-direction and the second saddle coil in the x-direction being azimuthally separated by approximately 180 degrees, and wherein the second pair of coils in the y-direction comprises a first saddle coil and a second saddle coil, the first saddle coil in the y-direction and the second saddle coil in they-direction being azimuthally separated by approximately 180 degrees.

6. The triaxial antenna assembly of claim 5, wherein the first saddle coil of the first pair of coils and the first saddle coil of the second pair of coils are aziumthally separated by approximately 90 degrees.

7. The triaxial antenna assembly of claim 1, wherein the slots minimize signal attenuation and maintain a magnetic moment direction of the first triaxial antenna.

8. The triaxial antenna assembly of claim 1, wherein the slots each overlay one of the two axial coils or one of the four saddle coils, and extend perpendicular to a direction in which the one of the two axial coils or the one of the four saddle coils extend where the slots overlay the one of the two axial coils or the one of the four saddle coils.

9. The triaxial antenna assembly of claim 1, wherein the two axial coils are configured to function as a single axial antenna located substantially halfway between the two axial coils.

10. The triaxial antenna assembly of claim 1, wherein the four saddle coils comprise a first pair of coils in an x-direction and a second pair of coils in one of a y-direction and a z-direction, and
    wherein the shield is configured to force fields in a first direction generated by the first pair of coils and a second direction generated by the second pair of coils to be equal by varying a length of the slots.

* * * * *